United States Patent
Jayakar et al.

(10) Patent No.: US 11,040,687 B2
(45) Date of Patent: Jun. 22, 2021

(54) ROOF-MOUNTED OCCUPANT RESTRAINT SYSTEM

(71) Applicant: TRW Vehicle Safety Systems Inc., Washington, MI (US)

(72) Inventors: Hylus Ranjit Raj Jayakar, Shelby Township, MI (US); Wael Youssef-Agha, Rochester Hills, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 0 days.

(21) Appl. No.: 16/427,400

(22) Filed: May 31, 2019

(65) Prior Publication Data

US 2020/0377052 A1 Dec. 3, 2020

(51) Int. Cl.
*B60R 21/214* (2011.01)
*B60R 21/2338* (2011.01)
*B60R 21/013* (2006.01)
*B60R 21/231* (2011.01)

(52) U.S. Cl.
CPC .......... *B60R 21/214* (2013.01); *B60R 21/013* (2013.01); *B60R 21/2338* (2013.01); *B60R 2021/23107* (2013.01); *B60R 2021/23161* (2013.01); *B60R 2021/23386* (2013.01)

(58) Field of Classification Search
CPC ........ B60R 2021/23153; B60R 21/214; B60R 2021/23161; B60R 2021/23386
See application file for complete search history.

(56) References Cited

U.S. PATENT DOCUMENTS

| 3,774,936 | A | 11/1973 | Barnett et al. |
| 6,722,691 | B1 | 4/2004 | Haland et al. |
| 9,446,733 | B2* | 9/2016 | Pausch ................. B60R 21/207 |
| 9,744,932 | B1 | 8/2017 | Faruque et al. |
| 9,994,182 | B1 | 6/2018 | Jaradi et al. |
| 10,023,145 | B1 | 7/2018 | Rivera et al. |
| 10,583,799 | B2* | 3/2020 | Schneider ........... B60R 21/2338 |
| 2012/0133114 | A1* | 5/2012 | Choi ..................... B60R 21/214 |
| | | | 280/728.2 |
| 2016/0311393 | A1 | 10/2016 | Smith et al. |
| 2017/0225641 | A1 | 8/2017 | Faruque et al. |
| 2017/0267204 | A1 | 9/2017 | Farooq et al. |

(Continued)

FOREIGN PATENT DOCUMENTS

| WO | 03076235 | 9/2003 |
| WO | 03093069 | 11/2003 |

*Primary Examiner* — Paul N Dickson
*Assistant Examiner* — Mary E Young
(74) *Attorney, Agent, or Firm* — Tarolli, Sundheim, Covell & Tummino LLP

(57) ABSTRACT

A restraint system is provided for helping to protect first and second occupants of a vehicle having a roof and a cabin with first and second seats for receiving the first and second occupants. The restraint system includes first and second airbags mounted to the vehicle roof. Each of the first and second airbags has a stored condition and is inflatable to a deployed condition aligned with the respective first and second occupants. The deployed first and second airbags are spaced from one another in an inboard-outboard direction. A tether is connected to the first and second airbags for limiting relative inboard-outboard movement between the airbags in response to occupant penetration.

23 Claims, 9 Drawing Sheets

(56) References Cited

U.S. PATENT DOCUMENTS

| | | | |
|---|---|---|---|
| 2017/0361802 A1 | 12/2017 | Farooq et al. | |
| 2018/0065585 A1 | 3/2018 | Jaradi et al. | |
| 2018/0215338 A1* | 8/2018 | Faruque | B60R 21/214 |
| 2018/0222432 A1 | 8/2018 | Schneider | |
| 2018/0229681 A1 | 8/2018 | Jaradi et al. | |
| 2018/0272985 A1 | 9/2018 | Nagasawa | |
| 2018/0361981 A1* | 12/2018 | Faruque | B60R 21/231 |
| 2019/0161048 A1* | 5/2019 | Thomas | B60R 21/215 |
| 2019/0202391 A1* | 7/2019 | Cho | B60R 21/233 |
| 2019/0241148 A1* | 8/2019 | Shin | B60R 21/2338 |
| 2019/0375363 A1* | 12/2019 | Abe | B60R 21/214 |
| 2020/0361410 A1* | 11/2020 | Jayakar | B60R 21/232 |
| 2020/0391689 A1* | 12/2020 | Fischer | B60R 21/214 |

* cited by examiner

ROOF-MOUNTED OCCUPANT RESTRAINT SYSTEM

TECHNICAL FIELD

The present invention relates generally to vehicle airbags and, in particular, relates to roof-mounted airbags connected by tethers.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free to utilize passenger cabin space as they see fit without being constrained to predetermined passenger arrangements, such as all forward-facing occupants, or vehicle structural configurations, such as steering wheel/ instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

According to one aspect, a restraint system is provided for helping to protect first and second occupants of a vehicle having a roof and a cabin with first and second seats for receiving the first and second occupants. The restraint system includes first and second airbags mounted to the vehicle roof. Each of the first and second airbags has a stored condition and is inflatable to a deployed condition aligned with the respective first and second occupants. The deployed first and second airbags are spaced from one another in an inboard-outboard direction. A tether is connected to the first and second airbags for limiting relative inboard-outboard movement between the airbags in response to occupant penetration.

According to another aspect, a restraint system is provided for helping to protect first and second occupants of a vehicle having a roof and a cabin with first and second seats for receiving the first and second occupants. The restraint system includes first and second airbags mounted to the vehicle roof. Each of the first and second airbags has a stored condition and is inflatable to a deployed condition aligned with the respective first and second occupants. Each of the first and second airbags includes an upper end connected to the vehicle roof and curves towards the respective first and second occupants to a lower end configured to engage the respective first and second occupant. The deployed first and second airbags are spaced from one another in an inboard-outboard direction. A tether is connected to the first and second airbags for limiting relative inboard-outboard movement between the airbags in response to occupant penetration.

Other objects and advantages and a fuller understanding of the invention will be had from the following detailed description and the accompanying drawings.

DETAILED DESCRIPTION

Figure 1:
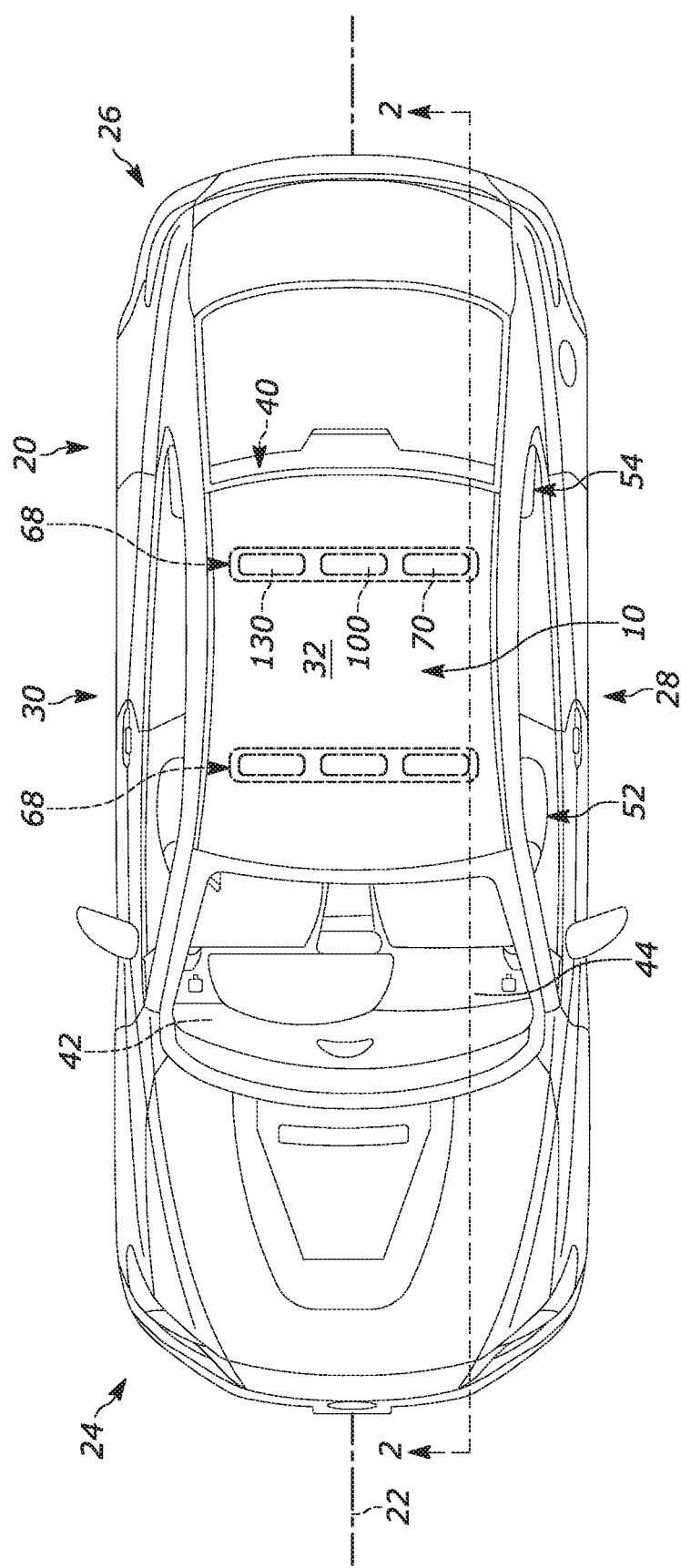
FIG. 1 is a top view of a vehicle including an example roof-mounted, occupant restraint system.
Figure 2:
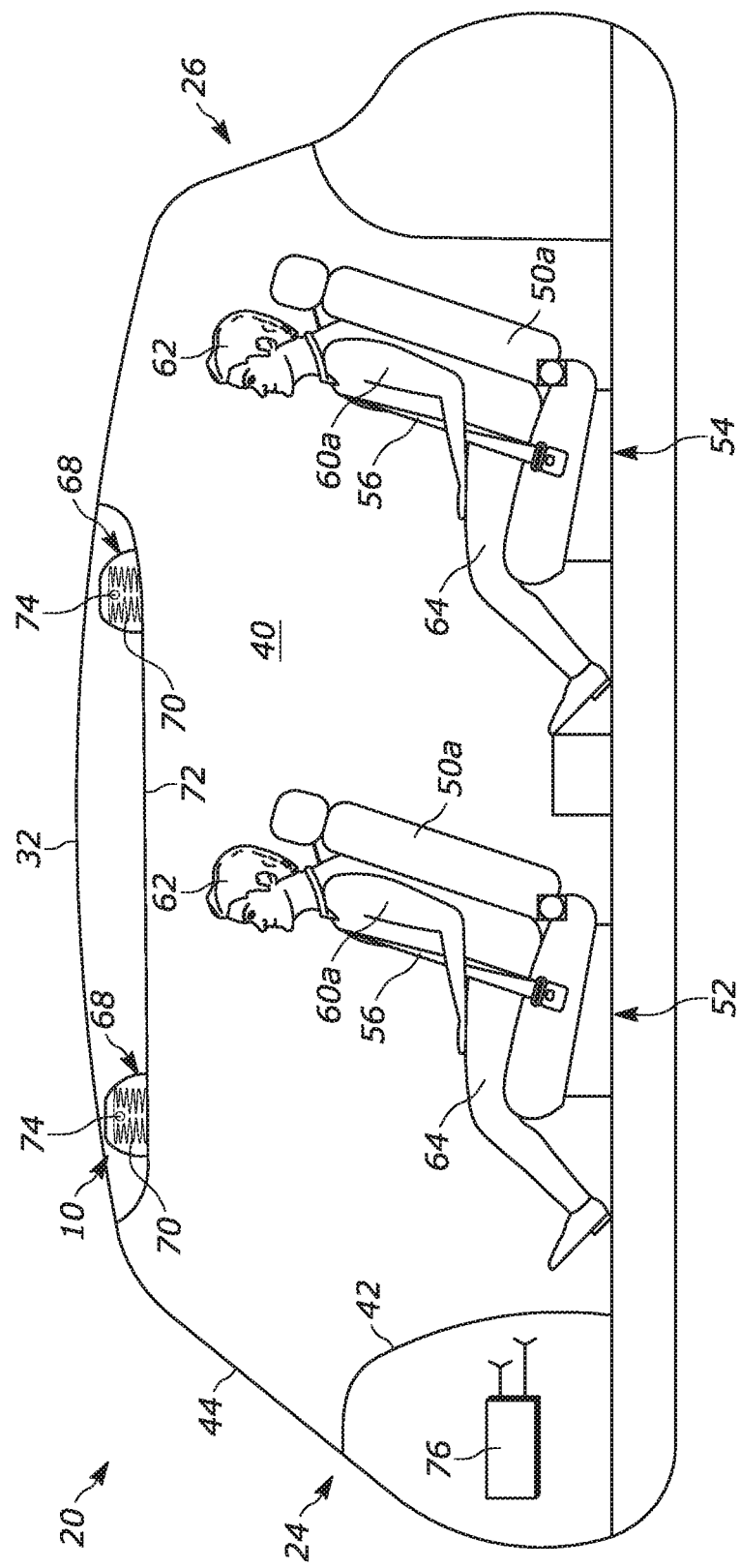
FIG. 2 is a schematic illustration of a cabin of the vehicle with a first seating arrangement and example airbags of the restraint system in a stored condition.

The present invention relates generally to vehicle airbags and, in particular, relates to roof-mounted airbags that include a tether. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22. The first end 24 of the vehicle 20 includes an instrument panel 42 facing a passenger compartment or cabin 40. A windshield or windscreen 44 can be located between the instrument panel 42 and the roof 32.

The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40.

Seats 50 are positioned in the cabin 40. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, oriented in a forward-facing manner similar to that of conventional automobiles. It will be appreciated that the vehicle 20 could alternatively include more or fewer rows of seats 50 (not shown). In the example shown, each row 52, 54 includes three seats, namely, a left side 26 seat 50a, a middle seat 50b, and a right side 30 seat 50c. Each seat 50a-50c receives an associated occupant 60a-60c and is fitted with a seatbelt 56 for restraining its occupant.

Figure 3:
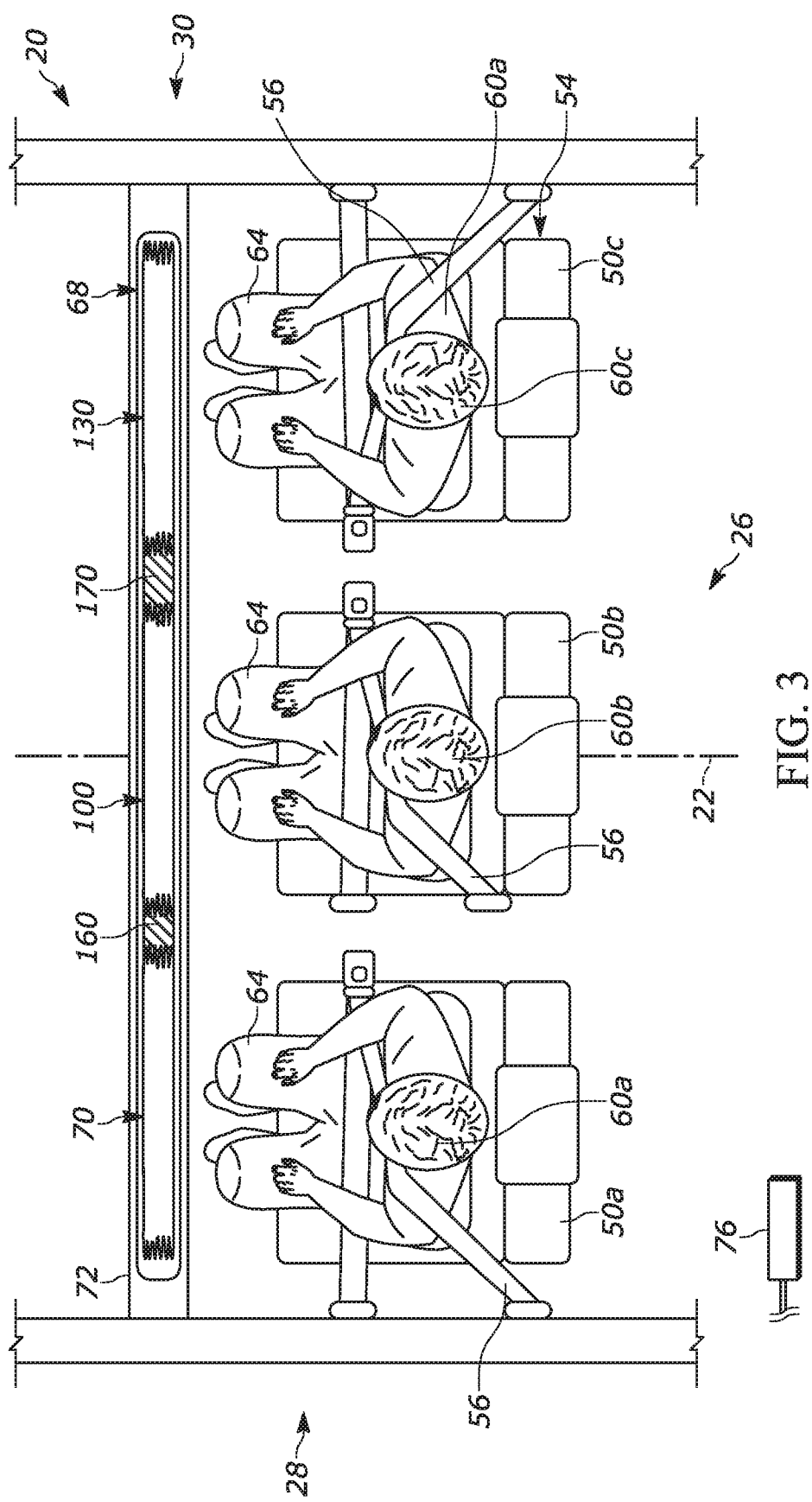
FIG. 3 is a top view of the cabin of FIG. 2.

For the conventional, forward-facing seating arrangement of FIGS. 2-3, in the event of a frontal crash, the occupants 60a-60c of both the front and rear rows 52, 54 are restrained by their respective seatbelts 56. Additional restraints are, however, desirable for head and neck support. This additional protection is typically provided, at least for the front row 52 occupants, by instrument panel mounted airbags. In the autonomous vehicle 20 of FIGS. 2-3, however, the instrument panel can be reduced in size and/or removed altogether. Control interfaces for climate controls, GPS, navigation, entertainment, etc. can, for example, be provided in a center console area of the vehicle 20 located between the occupants 60a-60c of the front and/or rear rows 52, 54.

Figure 4:
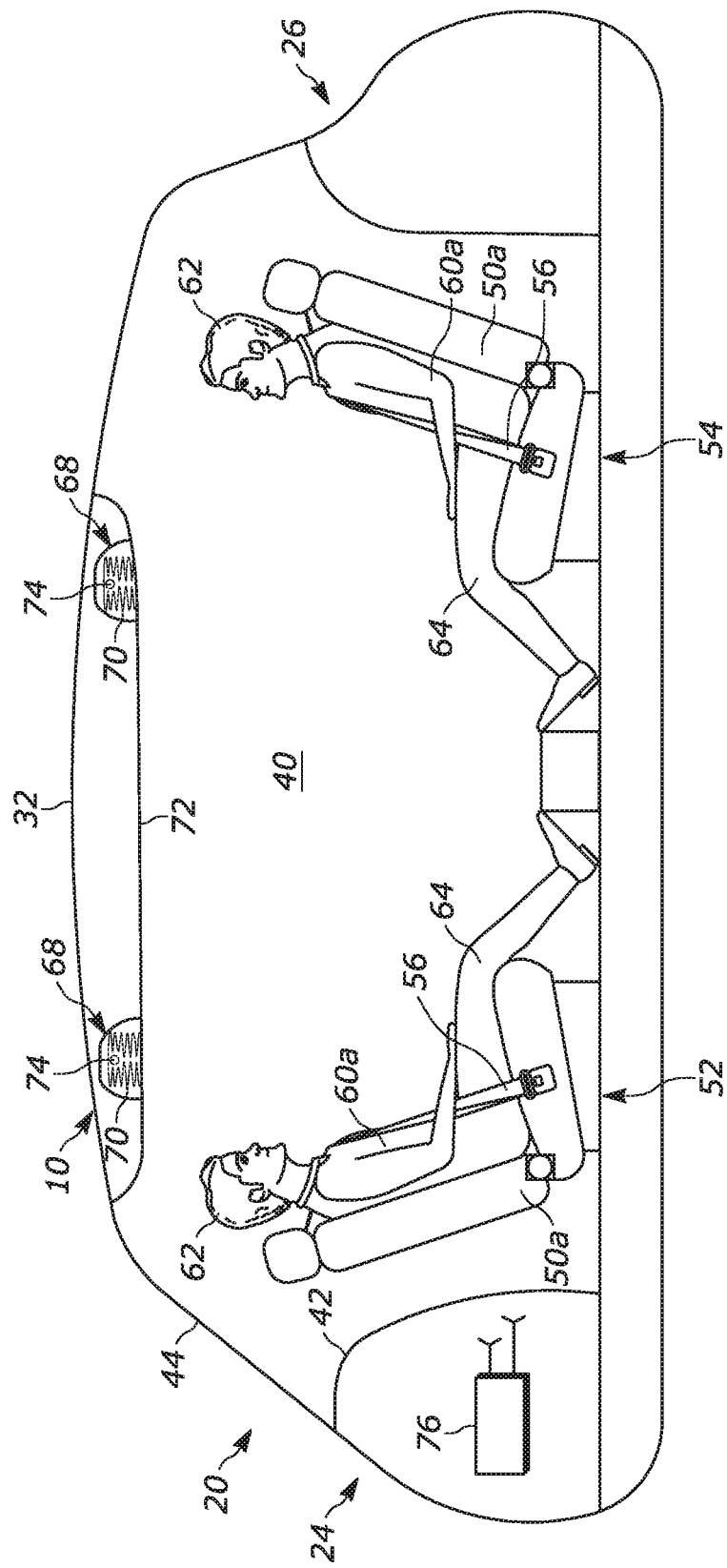
FIG. 4 is a schematic illustration of the cabin of the vehicle with a second seating arrangement and example airbags of the restraint system in a stored condition.

In another seating arrangement shown in FIG. 4, the vehicle 20 includes two rows of seats 50a-50c that face each other, with the front row 52 being rearward-facing and the rear row 54 being forward-facing. More or fewer rows of seats facing in either direction are also contemplated.

For the unconventional, forward-rearward seating arrangement shown, in the event of a frontal crash, the occupants 60a-60c of the forward-facing rear row 54 are restrained by their respective seatbelts 56. Occupants 60a-60c of the rear-facing front row 52, while buckled, are supported in a frontal crash by the seatbacks of the vehicle seats 50a-50c. Because of this, the seats 50a-50c must be constructed to support the occupants 60a-60c in the event of a crash. For the forward-facing occupants 60a-60c in the rear row 54, the seatbelts 56 offer some degree of restraint. It is desirable, however, for both rows 52, 54 to include additional restraints for head and neck support.

In either seating arrangement, since the front row 52 need not be in close proximity to the instrument panel 42 or the area where an instrument panel would normally reside, there can be a large volume of space between the front row 52 and the forward cabin structure presented facing the front row. This affects the forward-rearward spacing between the front and rear rows 52, 54. Because of this, it may not be efficient to deploy airbags from these locations due to the large volume that the airbags would need to occupy. This would present problems in sizing the airbag(s) and inflator(s) to occupy that large volume and could also present problems in deploying the airbag(s) into that large volume in the necessary short time required to protect occupants in a crash scenario.

It is therefore evident that the various passenger seating configurations enabled by autonomous vehicles can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface, such as an instrument panel, presents additional challenges.

To account for these challenges, the occupant restraint system 10 shown in FIGS. 1-3 includes vehicle occupant protection devices in the form of inflatable airbags 70, 100, 130 mounted in the roof 32 of the vehicle 20 and associated with each seat 50a-50c in each row 52, 54. It will be appreciated that more or fewer airbags can be provided for each row 52, 54.

Mounting the airbags 70, 100, 130 in the vehicle roof 32 is convenient because the airbags can be positioned in locations with a desired proximity to the occupants 60a-60c they are intended to help protect. This can help reduce the necessary inflatable volume of the airbags 70, 100, 130 and can also help provide a desired airbag deployment time without requiring an excessively high-volume inflator.

The airbags 70, 100, 130 are housed/concealed in the roof structure of the vehicle 20 behind, for example, a roof liner 72. The airbags 70, 100, 130 are at least one of rolled or folded before being placed behind the roof liner 72. The rolled airbags 70, 100, 130 can each be provided in a cover or housing/module 68 that is then placed behind the roof liner 72. The occupant restraint system 10 also includes an inflator 74 positioned in each module 68 for providing inflation fluid to the airbags 70, 100, 130. The inflators 74 are operatively connected (e.g., by wires) to an airbag controller 76 (see FIG. 2) that includes or communicates with one or more crash sensors (not shown). The airbag controller 76 is operative to determine the occurrence of a crash event and to actuate the inflators 74 in a known manner to inflate the airbags 70, 100, 130 associated therewith. The inflators 74 can be of any known type, such as stored gas, solid propellant, augmented or hybrid.

The airbags 70, 100, 130 can be constructed of any suitable material, such as nylon (e.g., woven nylon 6-6 yarns), and may be constructed in any suitable manner. For example, the airbags 70, 100, 130 may include one or more pieces or panels of material. If more than one piece or panel is used, the pieces or panels can be interconnected by known means, such as stitching, ultrasonic welding, heat bonding, or adhesives, to form the airbags 70, 100, 130. The airbags 70, 100, 130 can be uncoated, coated with a material, such as a gas impermeable urethane, or laminated with a material, such as a gas impermeable film. The airbags 70, 100, 130 can therefore have a gas-tight or substantially gas-tight construction. Those skilled in the art will appreciate that alternative materials, such as polyester yarn, and alternatives coatings, such as silicone, may also be used to construct the airbags 70, 100, 130.

The occupant restraint system 10 can include multiple sets of airbags 70, 100, 130 provided along the roof 32 and within the roof liner 72 at locations associated and aligned with the seats 50*a*-50*c* each row 52, 54. In other words, each row 52, 54 in the vehicle 20 can have an individual module 68 (with corresponding airbags 70, 100, 130 and inflator 74) associated and aligned therewith. In each case, each airbag 70, 100, 130 is positioned in front of the associated seat 50*a*-50*c* in each row 52, 54 in the direction the occupants 60*a*-60*c* in those seats would face (i.e., forward of the front row 52 and forward of the rear row 54 in the seating arrangement of FIG. 2; rearward of the front row and forward of the rear row in the seating arrangement of FIG. 3).

That said, the number of airbags within each module 68 can correspond with the number of seats in the row 52 or 54 associated therewith. Consequently, each module 68 can include more or fewer than the three airbags 70, 100, 130 shown and described herein. In any case, the airbags 70, 100, 130 extend in the left-to-right or inboard-outboard direction of the vehicle 20 and generally parallel to the width of the seats 50*a*-50*c*.

In the example shown in FIGS. 1-3, airbags 70, 100, 130 are provided behind the roof liner 72 and are each associated with a single seat 50*a*-50*c* in each row 52, 54. Although the airbags 70, 100, 130 within each example construction described herein are identical for each row provided in the vehicle 20, the construction and operation of only the airbags associated with the seats 50*a*-50*c* in the rear row 54 (FIG. 3) is discussed for brevity.

Since the front row 52 need not face forward and need not be in close proximity to the instrument panel 42 or the area where an instrument panel would normally reside, there can be a large volume of space between the front row 52 and the forward cabin structure presented facing the front row. Because of this, it may not be efficient to deploy airbags from this location due to the large volume that the airbags would need to occupy. This would present problems in sizing the airbag(s) and inflator(s) to occupy that large volume, and could also present problems in deploying the airbag(s) into that large volume in the necessary short time required to protect the occupants in a crash scenario.

As shown in FIG. 4, upon sensing the occurrence of an event for which inflation of the airbags 70, 100, 130 is desired, such as a vehicle collision, the controller 76 provides signals to the inflator 74. Upon receiving the signals from the controller 76, the inflator 74 is actuated and provides inflation fluid to the inflatable volumes of the airbags 70, 100, 130 in a known manner. The inflating airbags 70, 100, 130 exert a force on the roof liner 72, which causes the roof liner to open (e.g., via tear seam or door). This releases the airbags 70, 100, 130 to inflate and deploy from stored conditions behind the roof liner 72 to deployed conditions extending into the cabin 40 forward of and aligned with each seat 50*a*-50*c* in the rear row 54. The airbags 70, 100, 130 while inflated, help protect the vehicle occupants 60*a*-60*c* in the rear row 54 by absorbing the impact of the occupant. That said, while the specific construction is limited to the description of the airbags 70, 100, 130 associated with the rear row 54 for brevity, the airbags associated with the front row 52 have the same configuration and deployment.

Figure 5A:
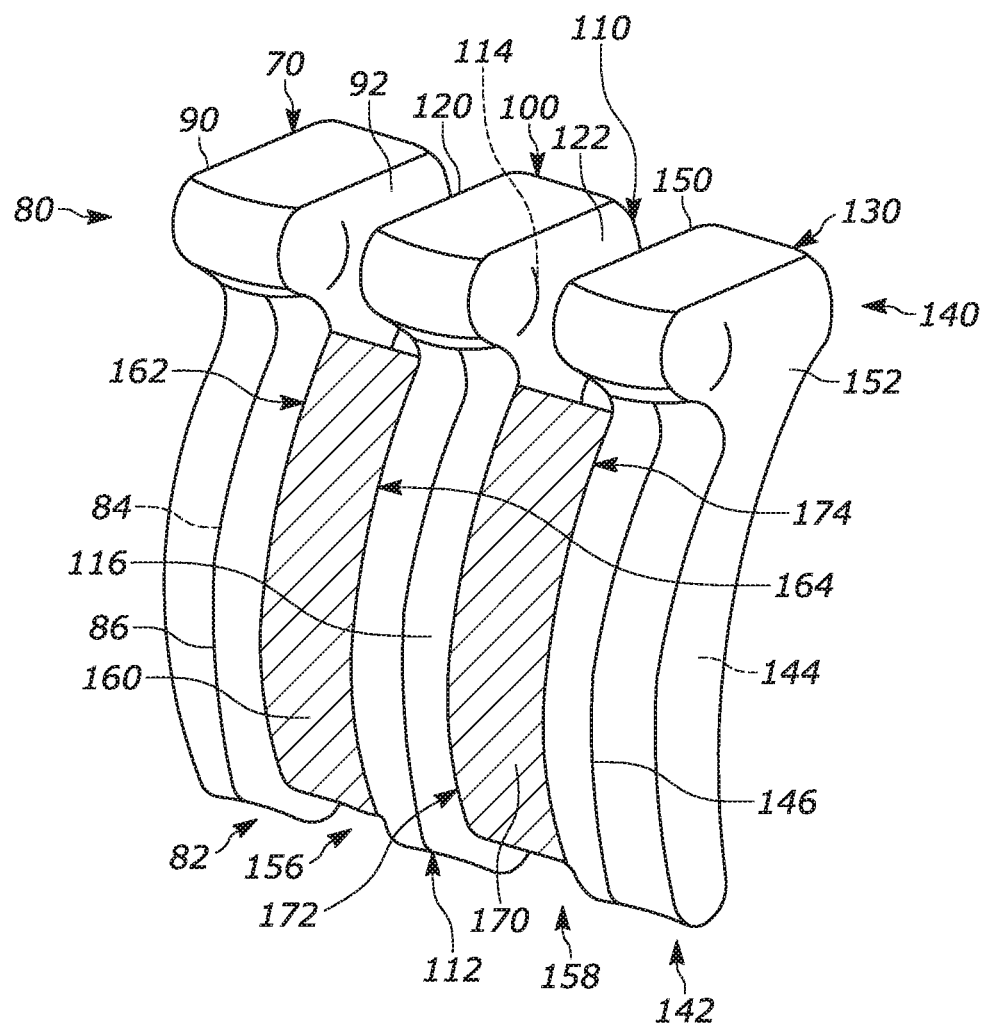
FIG. 5A is a rear perspective view of the airbags in a deployed condition.
Figure 5B:
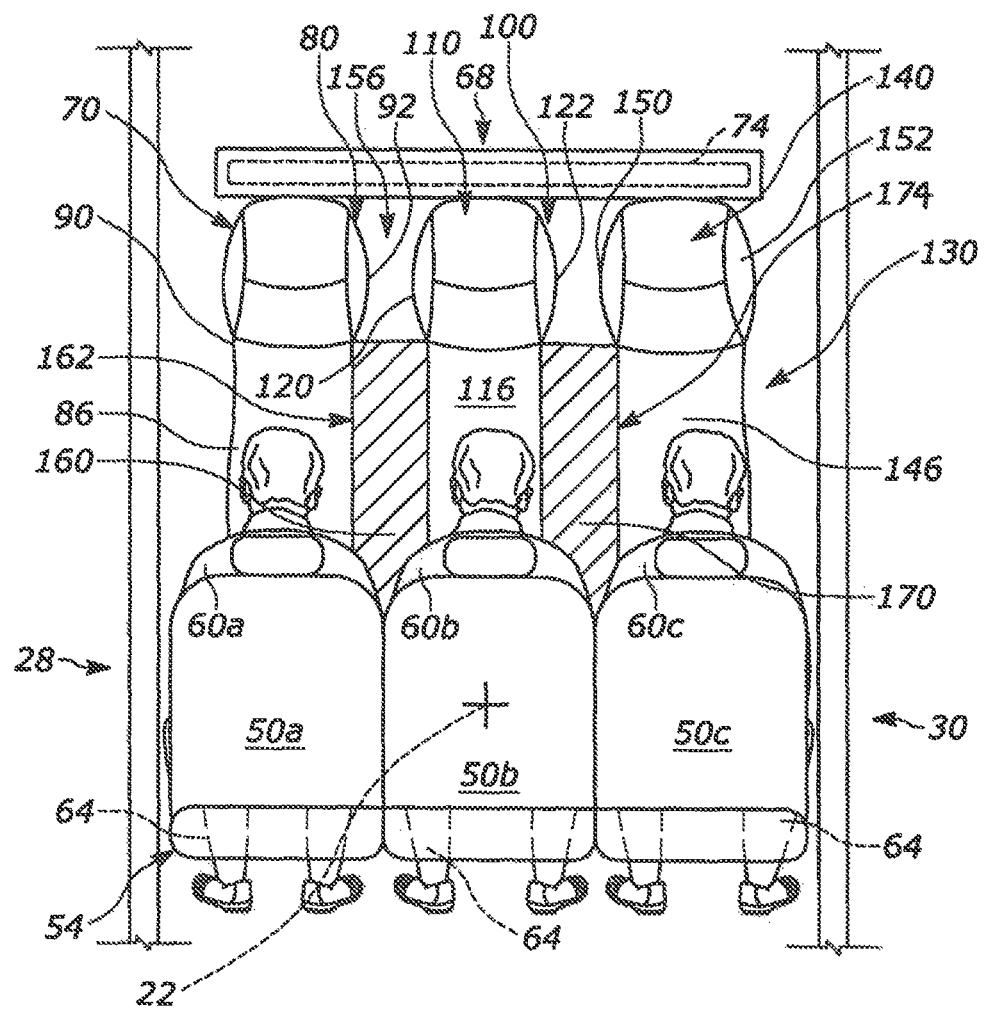
FIG. 5B is a rear view of the cabin with the airbags in the deployed condition.

Referring to FIGS. 5A-5B, the airbag 70, when deployed, extends from an upper end 80 to a lower end 82 and defines an inflatable volume 84. The upper end 80 is connected to the vehicle roof 32 and fluidly connected to the inflator 74. The lower end 82 is positioned adjacent the occupant 60*a* in the seat 50*a* in the rear row 54. In one example, the lower end 82 is configured to engage a lap or lower torso 64 of the occupant 60*a*. The airbag 70 includes an occupant facing portion or panel 86, a lateral side 90 facing the left side 28 of the vehicle 20, and a lateral side 92 facing the right side 30 of the vehicle. The occupant facing portion 86 is aligned with the seat 50*a*. The airbag 70 can have a curved configuration extending towards the occupant 60*a* (e.g., a concave shape).

The airbag 100, when deployed, extends from an upper end 110 to a lower end 112 and defines an inflatable volume 114. The upper end 110 is connected to the vehicle roof 32 and fluidly connected to the inflator 74. The lower end 112 is positioned adjacent the occupant 60*b* in the seat 50*b* in the rear row 54. In one example, the lower end 112 is configured to engage the lap or lower torso 64 of the occupant 60*b*. The airbag 100 includes an occupant facing portion or panel 116, a lateral side 120 facing the left side 28 of the vehicle 20, and a lateral side 122 facing the right side 30 of the vehicle. The occupant facing portion 116 is aligned with the seat 50*b*. The airbag 100 can have a curved configuration extending towards the occupant 60*b*.

The airbag 130, when deployed, extends from an upper end 140 to a lower end 142 and defines an inflatable volume 144. The upper end 140 is connected to the vehicle roof 32 and fluidly connected to the inflator 74. The lower end 142 is positioned adjacent the occupant 60*c* in the seat 50*c* in the rear row 54. In one example, the lower end 142 is configured to engage the lap or lower torso 64 of the occupant 60*c*. The airbag 130 includes an occupant facing portion or panel 146, a lateral side 150 facing the left side 28 of the vehicle 20, and a lateral side 152 facing the right side 30 of the vehicle. The occupant facing portion 146 is aligned with the seat 50*c*. The airbag 130 can have a curved configuration extending towards the occupant 60*c*.

As shown, the airbags 70, 100, 130 deploy generally parallel to one another from the roof 32 and toward the occupants 60*a*-60*c* in the associated seats 50*a*-50*c*. That said, a space 156 exists between the first and second airbags 70, 100. A space 158 exists between the second and third airbags 100, 130. The spaces 156, 158 are in the inboard-outboard direction.

A first tether 160 extends between the first and second airbags 70, 100 and includes a first end 162 connected to the lateral side 92 and/or occupant facing portion 86 of the first airbag. A second end 164 of the first tether 160 is connected to the lateral side 120 and/or the occupant facing portion 116 of the second airbag 100. The first tether 160 helps to prevent relative inboard-outboard movement between the first and second airbags 70, 100.

A second tether 170 extends between the second and third airbags 100, 130 and includes a first end 172 connected to the lateral side 122 and/or occupant facing portion 116 of the second airbag. A second end 174 of the second tether 170 is connected to the lateral side 150 and/or occupant facing portion 146 of the third airbag 130. The second tether 170 helps to prevent relative inboard-outboard movement between the second and third airbags 100, 130. The first and second tethers 160, 170 are made from an inextensible material.

Figure 5C:
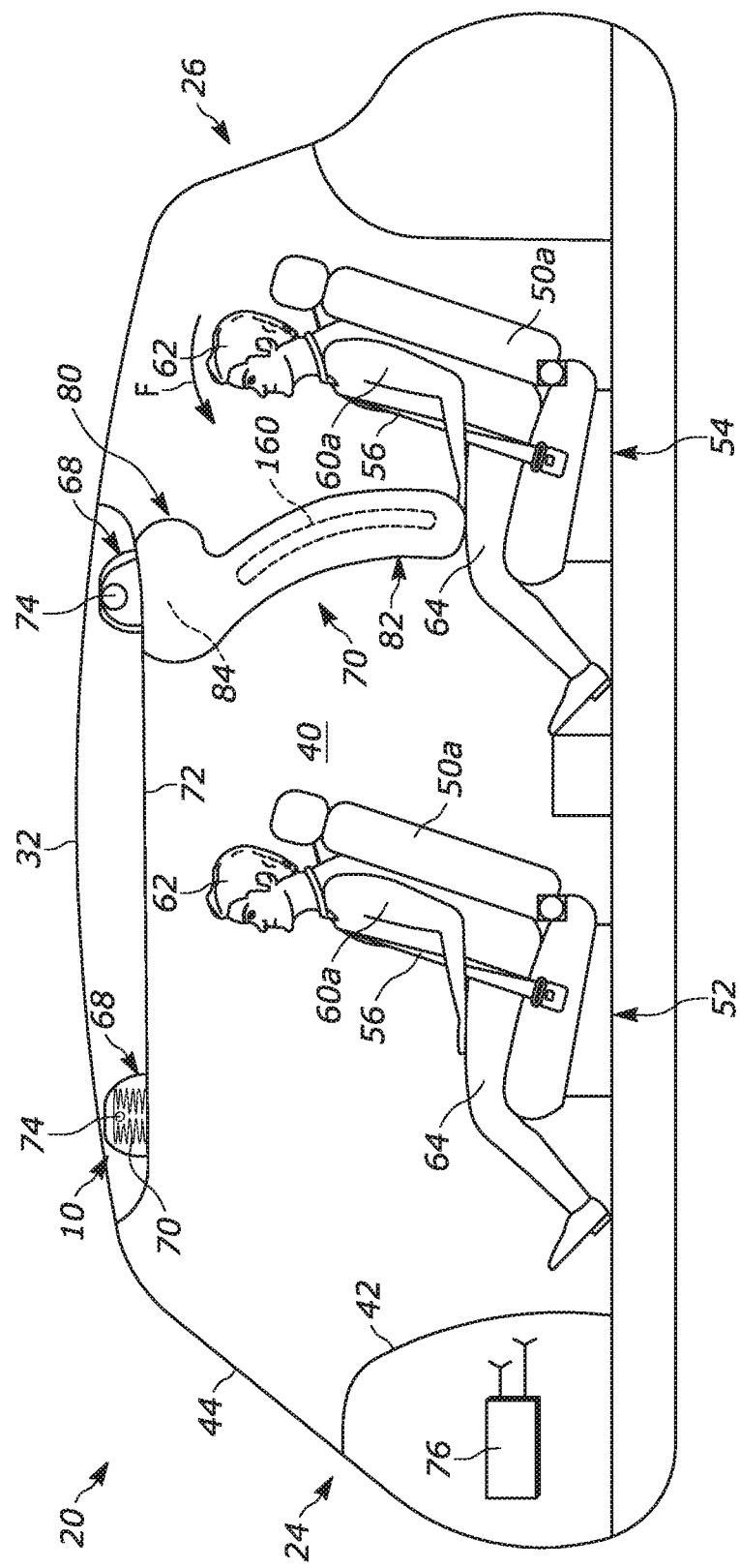
FIG. 5C is a side view of the cabin with the airbags in the deployed condition.

When a vehicle crash occurs (see FIG. 5C), the occupants 60*a*-60*c* can move generally in the forward-rearward direction of the vehicle (i.e., along or parallel to the vehicle centerline 22). This occurs when the impact is at the first end 24 or rear end 26 of the vehicle 20 along or substantially along the centerline 22. Because the occupants 60a-60c are belted, a frontal crash resulting in forward occupant movement causes the occupants to bend at the waist and follow an angled or arcuate path toward the occupant facing portions 86, 116, 146, respectively, as indicated generally by the arrow F in FIG. 5C. Once the moving occupants 60a-60c engage the occupant facing portions 86, 116, 146, the airbags 70, 100, 130 are urged to move in the direction F.

In this manner, the airbags 70, 100, 130, being held in place at the upper ends 80, 110, 140 and lower ends 82, 112, 142 by the vehicle roof 32 and occupant laps 64, provide reaction forces that are opposite the impact forces applied to the airbags by the penetrating occupants 60a-60c. More specifically, constraining movement of the upper ends 80, 110, 140 and lower ends 82, 112, 142 restricts movement of the occupants 60a-60c along the path F. The example airbags 70, 100, 130 therefore require no interaction with forward structure of the vehicle, such as an instrument panel, steering wheel, or seat, to provide a reaction surface for the airbags.

As noted, there is no vehicle structure in position to act as a reaction surface to constrain movement of the deployed airbags 70, 100, 130. That said, engagement of the lower ends 82, 112, 142 of the airbags 70, 100, 130 with the respective occupants 60a-60c restricts/prevents movement of the lower ends of the airbags during occupant penetration and allows the airbags to provide desired ride-down characteristics.

Figure 6A:
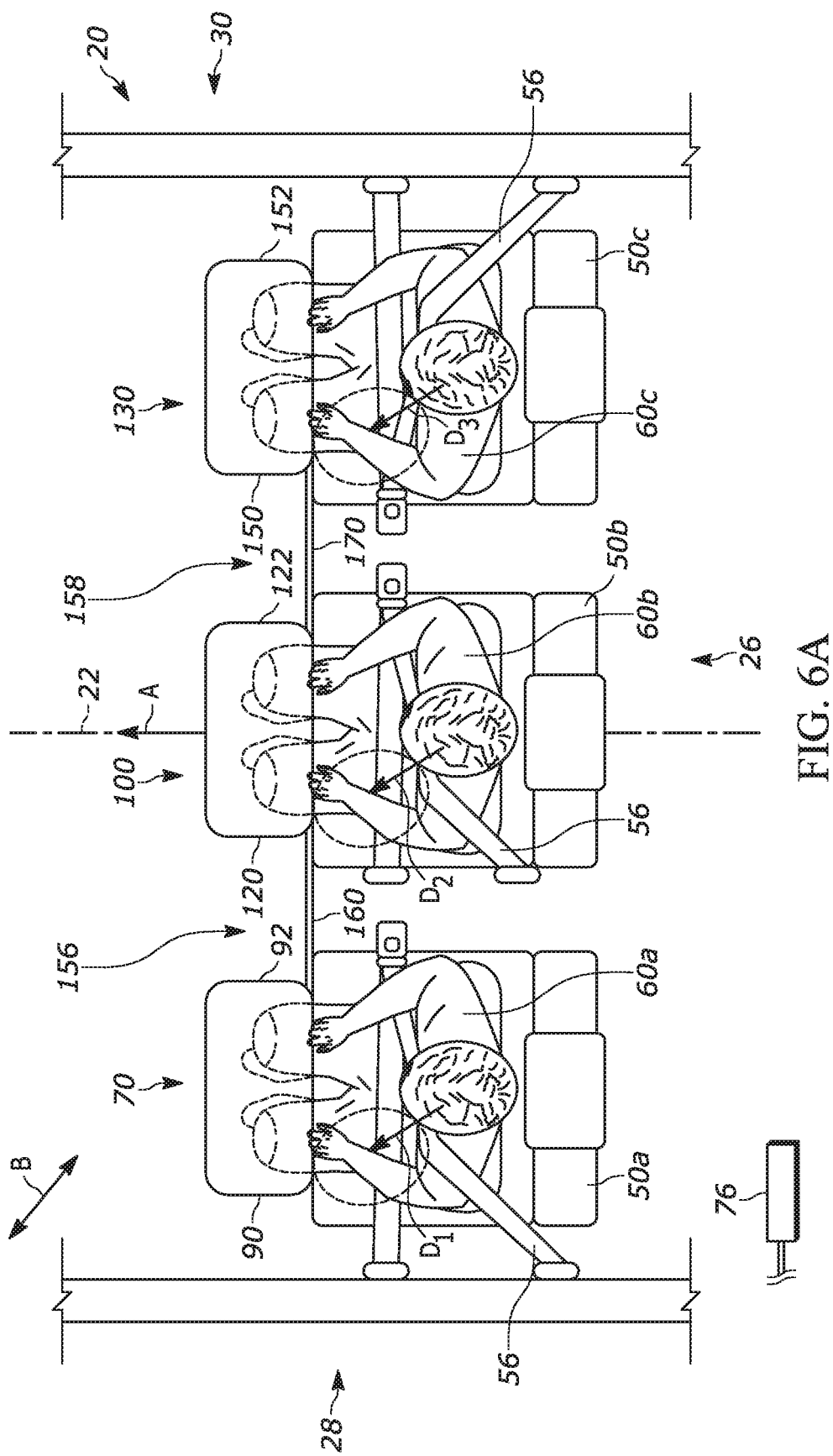
FIG. 6A is a top view of the restraint system of FIG. 2 in a left oblique crash.

Alternatively, the occupants 60a-60c can move in on oblique manner towards the deployed airbags 70, 100, 130 (i.e., at angle relative to the centerline 22) in response to an oblique impact and/or when sitting in the seats 50a-50c in an offset or angled manner. Referring to FIG. 6A, an oblique impact is meant to refer to scenarios where the impact results in the occupants 60a-60c moving obliquely forward in the vehicle 20 in a direction that is non-parallel to the vehicle centerline 22 and the direction of forward vehicle travel (see arrow A).

For example, a left oblique impact (FIG. 6A) can occur on the left side 28 of the vehicle 20 in response to, for example, the vehicle skidding at an angle into another vehicle or barrier, or in response to being struck by another vehicle moving at an angle. The left oblique impact is illustrated generally by the double arrow labeled B. Similarly, a right oblique impact (FIG. 6B) can occur on the right side 30 of the vehicle 20 in response to, for example, the vehicle skidding at an angle into another vehicle or barrier, or in response to being struck by another vehicle moving at an angle. The right oblique impact is illustrated generally by the double arrow labeled C.

In the event of an oblique impact, the occupants 60a-60c move forward in the vehicle 20 in a direction that is angled either leftward towards the left side 28 of the vehicle 20 or rightward towards the right side 30 of the vehicle. A left oblique impact B (FIG. 6A) causes the occupants 60a-60c to move forward-leftward in the respective directions $D_1$-$D_3$ toward the positions indicated generally in dashed lines. More specifically, the occupant 60a moves in the forward-outboard direction $D_1$. The occupant 60b moves in the forward-outboard direction $D_2$. The occupant 60c moves in the forward-inboard direction $D_3$.

Conversely, in the event of a right oblique impact C (FIG. 6B), the occupants 60a-60c move forward-rightward in the respective directions $D_4$-$D_6$ toward the positions indicated generally in dashed lines. More specifically, the occupant 60a moves in the forward-inboard direction $D_4$. The occupant 60b moves in the forward-outboard direction $D_5$. The occupant 60c moves in the forward-outboard direction $D_6$.

Of course, the oblique directions in which the occupants 60a-60c move, and their resulting positions, can vary depending on the particulars of the impact event, such as the angle and/or velocity at which the vehicle 20 impacts another vehicle or object. Therefore, the oblique outboard and inboard directions of occupant 60a-60c movement indicated by the respective arrows $D_1$-$D_6$, and the resulting respective position of each occupant, is by way of example only.

The degree to which the airbags 70, 100, 130 can help protect the occupants 60a-60c in an oblique impact depends on the degree to which occupant movement deviates from the forward direction (i.e., the angle between arrows A and $D_1$-$D_3$ or between arrows A and $D_4$-$D_6$). As the degree to which occupant 60a-60c movement deviates from the forward direction (i.e., as the angle increases) the ability of the airbags 70, 100, 130 to help protect the occupants 60a-60c when deploying in the manner shown in FIGS. 1-6B also decreases. Thus, as the occupants' movements become increasingly oblique, the ability of the airbags 70, 100, 130 shown in FIGS. 1-6B to help protect the occupants 60a-60c decreases.

In particular, as occupant 60a-60c movement becomes more oblique, the likelihood of one or more of the occupants 60a-60c striking the lateral side(s) 92, 120, 122, 150 of the airbags 70, 100, 130 and slipping into the spaces 156, 158 between the deployed airbags increases. This could result in the occupants 60a-60c slipping off the respective airbag 70, 100, 130 and/or causing the airbags to move away from one another in the inboard-outboard direction, thereby preventing the airbags from adequately receiving the occupants.

With this in mind, the tethers 160, 170 help maintain a desirable inboard-outboard spacing between the airbags 70, 100, 130 and help limit/prevent the airbags from moving away from one another in the inboard-outboard direction in response to the occupants 60a-60c moving in an oblique manner into engagement with the airbags and/or tethers. To this end, in the left oblique impact of FIG. 6A, the tether 160 prevents the occupant 60b from moving into the space 156 or causing inboard-outboard separation of the airbags 70, 100. The tether 170 prevents the occupant 60c from moving into the space 158 or causing inboard-outboard separation of the airbags 100, 130.

The tethers 160, 170 are secured to the airbags 70, 100, 130 and, thus, the impact forces experienced by the tethers from the penetrating occupants 60b, 60c are transferred to the airbags. Since the airbags 70, 100, 130 are held in place by the roof 32 and occupants' laps 64, the penetrating occupants 60b, 60c are restrained and ride-down on the airbags even when striking the tethers 160, 170.

Figure 6B:
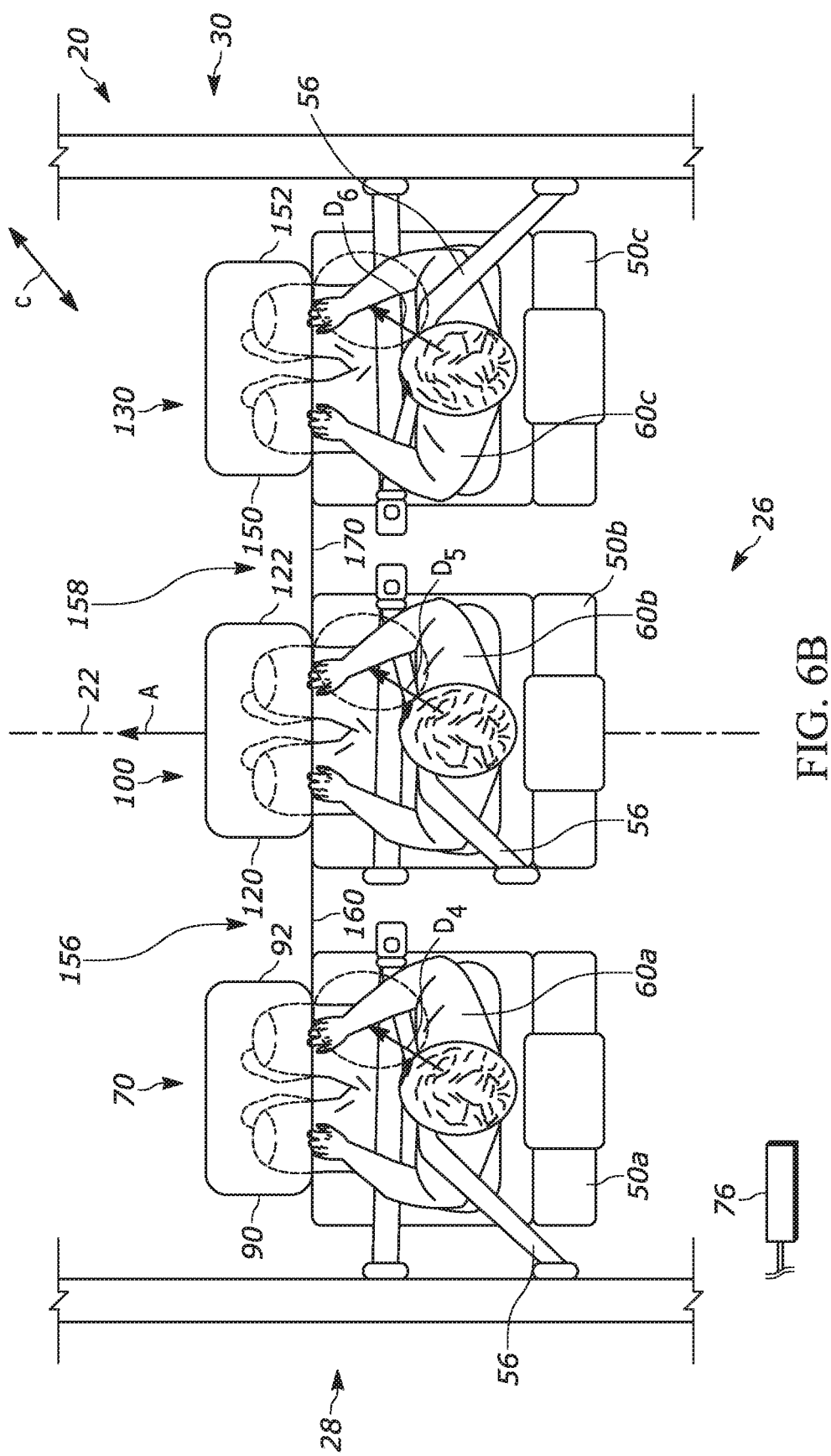
FIG. 6B is a top view of the restraint system of FIG. 2 in a right oblique crash.

Similarly, in the right oblique impact of FIG. 6B, the tether 160 prevents the occupant 60a from moving into the space 156 or causing inboard-outboard separation of the airbags 70, 100. The tether 170 prevents the occupant 60b from moving into the space 158 or causing inboard-outboard separation of the airbags 100, 130. The tethers 160, 170 are secured to the airbags 70, 100, 130 and, thus, the impact forces experienced by the tethers from the penetrating occupants 60a, 60b are transferred to the airbags. Since the airbags 70, 100, 130 are held in place by the roof 32 and occupants' laps 64, the penetrating occupants 60a, 60b are restrained and ride-down on the airbags even when striking the tethers 160, 170. The tethers 160, 170 shown and described herein are therefore advantageous in helping to prevent the occupants 60a-60c from slipping off the airbags 70, 100, 130 and/or causing inboard-outboard separation of the airbags in response to an oblique crash.

From the above, it will be appreciated that the example configurations of FIGS. 1-6B illustrate that the airbags are configured to utilize the vehicle roof and occupant as reaction surfaces in both the conventional and unconventional seating arrangements. By "reaction surface," it is meant that it is the vehicle roof and occupants that support the airbags against movement in response to an impacting occupant. In other words, the airbags attempts to move in a first direction and the roof/occupants apply a reaction force to the airbags in a second, opposite (or substantially opposite) direction to limit/prevent movement of the airbags in the first direction. This allows the airbags to absorb impact forces of the occupant and provide the desired ride-down effect.

Advantageously, the example configurations can require only the vehicle roof and the occupant to provide the reaction surfaces and can provide effective occupant protection without requiring any support from structure presented forward of the occupants. The vehicle roof can also support the airbag module and the airbag entirely.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

We claim:

1. A restraint system for helping to protect first and second occupants of a vehicle having a roof and a cabin with first and second seats for receiving the first and second occupants, comprising:
    first and second airbags mounted to the vehicle roof, each of the first and second airbags having a stored condition and configured to be inflatable to a deployed condition aligned with the respective first and second occupants and extending downward from the roof to a position above the respective first and second seats, the deployed first and second airbags being spaced from one another in an inboard-outboard direction; and
    a tether connected to the first and second airbags for limiting relative inboard-outboard movement between the airbags in response to occupant penetration.

2. The restraint system recited in claim 1, wherein each of the first and second airbags includes an occupant facing portion, the tether being connected to the occupant facing portions of the first and second airbags.

3. The restraint system recited in claim 1, wherein each of the first and second airbags includes a lateral portion facing the inboard-outboard direction of the vehicle, the tether being connected to the lateral portions of the first and second airbags.

4. The restraint system recited in claim 1, wherein each of the first and second airbags configured to be curved towards the respective first and second occupant.

5. The restraint system recited in claim 1, wherein each of the first and second airbags includes an upper end connected to the vehicle roof and a lower end configured to engage a lap of the respective first and second occupant.

6. The restraint system recited in claim 1, wherein the first and second airbags are provided in a single module in the vehicle roof.

7. The restraint system recited in claim 1, further comprising:
    a sensor for sensing an occurrence of an event for which deployment of the first and second airbags is desired and producing a signal indicative thereof; and
    a controller connected to the sensor and, in response to receiving the signal, actuating an inflator to inflate the first and second airbags to the deployed condition.

8. The restraint system recited in claim 1 further comprising a third airbag mounted to the vehicle roof and configured to be inflatable to a deployed condition aligned with a third occupant in a third seat of the vehicle.

9. The restraint system recited in claim 8 further comprising a second tether connected to the second and third airbags for limiting relative inboard-outboard movement between the second and third airbags.

10. The restraint system recited in claim 9, wherein each of the second and third airbags includes an occupant facing portion, the second tether being connected to the occupant facing portions of the second and third airbags.

11. The restraint system recited in claim 9, wherein each of the second and third airbags includes a lateral portion facing the inboard-outboard direction of the vehicle, the second tether being connected to the lateral portions of the second and third airbags.

12. The restraint system recited in claim 8, wherein the third airbag configured to be curved towards the third occupant.

13. The restraint system recited in claim 8, wherein the third airbag includes an upper end connected to the vehicle roof and a lower end configured to engage a lap of the third occupant.

14. The restraint system recited in claim 8, wherein the first, second and third airbags are provided in a single module in the vehicle roof.

15. The restraint system recited in claim 8, further comprising:
    a sensor for sensing an occurrence of an event for which deployment of the first, second, and third airbags is desired and producing a signal indicative thereof; and
    a controller connected to the sensor and, in response to receiving the signal, actuating an inflator to inflate the first, second, and third airbags to the deployed condition.

16. The restraint system recited in claim 1, wherein the restraint system has a number of inflatable volumes equal to the number of seats in a row of the vehicle.

17. The restraint system recited in claim 1, wherein each of the first and second airbags defines an inflatable volume configured to have a width in the inboard-outboard direction substantially equal to the width of the respective first and second seats.

18. A restraint system for helping to protect first and second occupants of a vehicle having a roof and a cabin with first and second seats for receiving the first and second occupants, comprising:
    first and second airbags mounted to the vehicle roof, each of the first and second airbags having a stored condition and configured to be inflatable to a deployed condition aligned with the respective first and second occupants, each of the first and second airbags including an upper end connected to the vehicle roof and curving towards the respective first and second occupants to a lower end terminating at a position above the respective first and second seats and configured to engage a lap of the respective first and second occupant, the deployed first and second airbags being spaced from one another in an inboard-outboard direction; and a tether connected to the first and second airbags for limiting relative inboard-outboard movement between the airbags in response to occupant penetration, wherein each of the first and second airbags defines an inflatable volume configured to have a width in the inboard-outboard direction substantially equal to the width of the respective first and second seats.

19. The restraint system recited in claim 18 further comprising a third airbag mounted to the vehicle roof and configured to be inflatable to a deployed condition aligned with a third occupant in a third seat of the vehicle.

20. The restraint system recited in claim 19 further comprising a second tether connected to the second and third airbags for limiting relative inboard-outboard movement between the second and third airbags.

21. The restraint system recited in claim 19, wherein the third airbag includes an upper end connected to the vehicle roof and a lower end configured to engage a lap of the third occupant.

22. The restraint system recited in claim 19, wherein the first, second, and third airbags are provided in a single module in the vehicle roof.

23. The restraint system recited in claim 18, wherein the restraint system has a number of inflatable volumes equal to the number of seats in a row of the vehicle.

\* \* \* \* \*